United States Patent [19]

Grumet et al.

[11] 4,421,379
[45] Dec. 20, 1983

[54] MULTIPLE HOLOGRAPHIC LENS

[75] Inventors: Alex Grumet, Whitestone, N.Y.; Abe Wolf, Sun City West, Ariz.; Gaspar J. Calderone, Lake Grove, N.Y.

[73] Assignee: Grumman Aerospace Corporation, Bethpage, N.Y.

[21] Appl. No.: 224,279

[22] Filed: Jan. 12, 1981

[51] Int. Cl.³ .............................................. G02B 5/32
[52] U.S. Cl. .................................... 350/3.72; 350/167
[58] Field of Search ...................... 350/1.1, 3.70, 3.72, 350/3.73, 167, 417

[56] References Cited
U.S. PATENT DOCUMENTS 3,405,614  10/1968  Lin et al. ............................ 350/3.73

FOREIGN PATENT DOCUMENTS 1342747  12/1970  United Kingdom ............... 350/3.73

Primary Examiner—Bruce Y. Arnold
Assistant Examiner—William Propp
Attorney, Agent, or Firm—John P. Kozma; Richard G. Geib; Daniel J. Tick

[57] ABSTRACT

A two step process allows a multiple holographic lens to be recorded with a single exposure. A multiple exposure, non-overlapping holographic fly's eye lens is first prepared with the correct F number spacing. A single collimated beam striking the fly's eye lens results in a multiple refracted beam array which is allowed to interfere with a second reference beam on a photographic plate. The resulting multiple holographic lens will have equal intensity playback beams, no distortion cross product terms, and improved optical efficiency over multiple superimposed exposure lenses.

11 Claims, 3 Drawing Figures

MULTIPLE HOLOGRAPHIC LENS

BACKGROUND OF THE INVENTION

This invention relates to a method for fabricating a multiple holographic lens from a fly's eye lens with a single exposure. One example of an application of multiple holographic lenses is to provide for parallel addressing of many discrete matched filter memory elements with a single input laser beam.

Present techniques of fabricating such lenses require multiple superimposed exposures for multiple storage elements. Multiple exposures result in distortion, reduced efficiency, and non-uniformity among channels on playback.

If on the order of a hundred or more elements are to be recorded using multiple exposures, the intensity of the reference and signal beams of each exposure must be reduced, relative to what would be used for a single exposure hologram, to avoid overexposing the film. However, the reduction in recording beam intensity also reduces the intensity of the desired playback or reconstruction beam. Undesired beams may be characterized as cross-product terms resulting from the phasor multiplication of the many holographically stored beams in the recording of the lens. The cross product terms also reduce the efficiency of the lens since a larger proportion of the incident beam on reconstruction is diverted to undesired refraction beams.

Further inefficiency results due to an inability to use the proper biasing value of the film's characteristic curve. This is because the cumulative intensity of the multiple exposures fogs; i.e., biases the film toward the saturation of non-linear end of the film's characteristic curve, resulting in distortion and nonuniformity of beams on playback.

A final deficiency in the present techniques of fabricating multiple holographic lenses is that there is no way to select both the f-number and the focal length of the completed lens. Thus, either the f-number is determined by a selected focal length, or the focal length follows from a selected f-number.

SUMMARY OF THE INVENTION

It is one object of this invention to provide a method for fabricating multiple holographic lenses with improved efficiency.

A further object of this invention is to provide a method for fabricating multiple holographic lenses with no cross-product distortion terms.

It is yet another object of this invention to provide a method for fabricating multiple holographic lenses which will have equal playback beam intensity.

It is yet a further object of this invention to provide a method for fabricating multiple holographic lenses which allows independent selection of both the f-number and focal length of the completed lens.

The method of fabricating a multiple holographic lens according to the present invention involves a two-step process. In the first step, all the exposures to be recorded on the final lens are recorded individually on non-overlapping areas of a first photographic plate to form a fly's eye lens having a desired f-number. A mask confines the exposure areas of the individual lenslets with no overlap and thus prevents the introduction of cross-product terms.

The second step is the actual exposure of the multiple holographic lens. A collimated beam illuminates the reverse side of the completed fly's eye lens, giving rise to divergent refracted beams, one from each lenslet, which simultaneously duplicate the individual exposures recorded in the first step. The overlapping refracted beams illuminate a common area on a second photographic plate, where they are allowed to interfere with a second collimated reference beam to form the multiple lens in a single exposure. Thus, the square of the phasor sum of the multiple refracted beams is stored in the emulsion. In the prior art, multiple overlapping exposures resulted in emulsions containing the sum of the squares of each beam.

Another advantage of the present invention over prior art is that by using a single beam to create the refracted beams, any variation among the playback beams is precluded. Further, because the film is not subject to repeated exposure to the reference beam, the intensity of the reference beam and exposure time can be selected to optically bias the beam on the linear portion of the film characteristic curve.

Independent selection of the f-number and focal length is also possible in the process of the present invention. The f-number is determined in the first step of the process, while the spacing between the fly's eye lens and the second photographic plate determines the focal length.

DESCRIPTION OF PREFERRED EMBODIMENT

Figure 1:
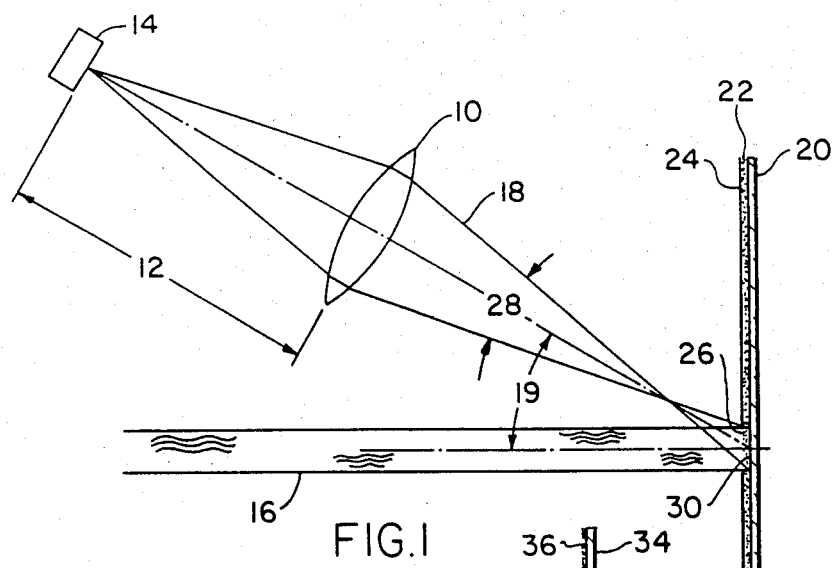
FIG. 1 shows the set up for fabricating the fly's eye lens.

Referring to FIG. 1, the first step of the two step process of the present invention involves the fabrication of a fly's eye lens with a desired number, pattern and spacing of lenslets of desired f-number. Any suitable fly's eye lens, such as a plastic lens, may be used to practice the present invention. In the preferred embodiment, a holographic fly's eye lens with the desired specifications is fabricated because it can easily be fabricated to give the correct off-axis beams.

A lens 10 is spaced distance 12 from spatial filter 14. The lens 10 may be an ordinary spherical lens, a cylindrical lens, an anamorphic lens or any specially corrected aspheric lens. The spatial filter 14 may be any device which produces a simulated point light source. Distance 12 and the focal length of lens 10 are chosen to give the desired f-number of the completed lens as explained later herein.

Figure 2:
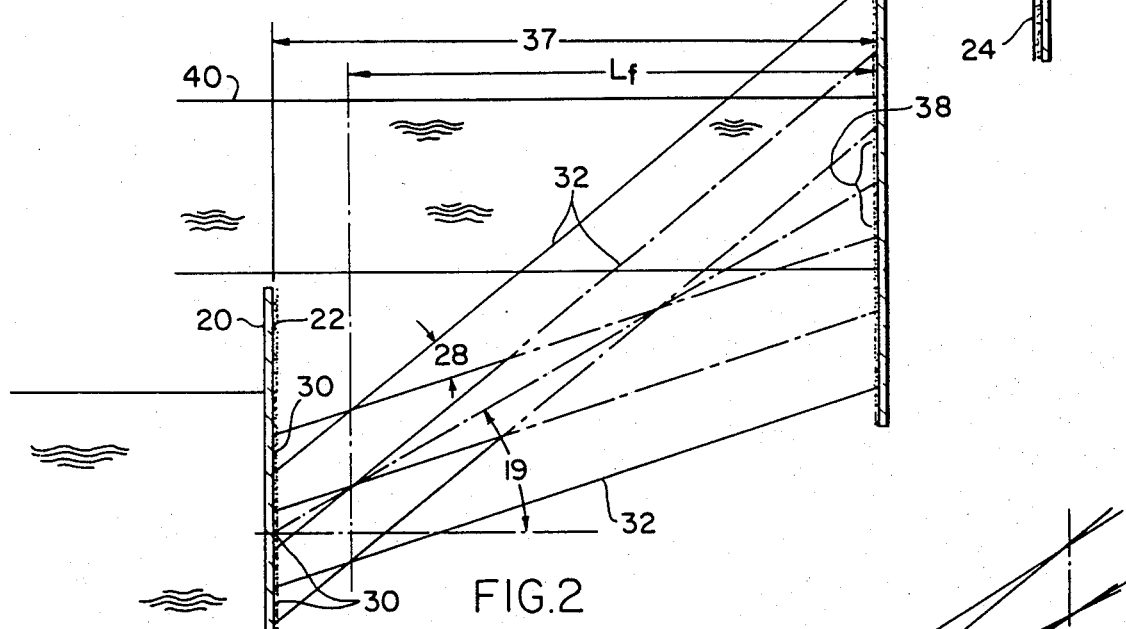
FIG. 2 shows the set up for exposing the multiple lens.
Figure 3:
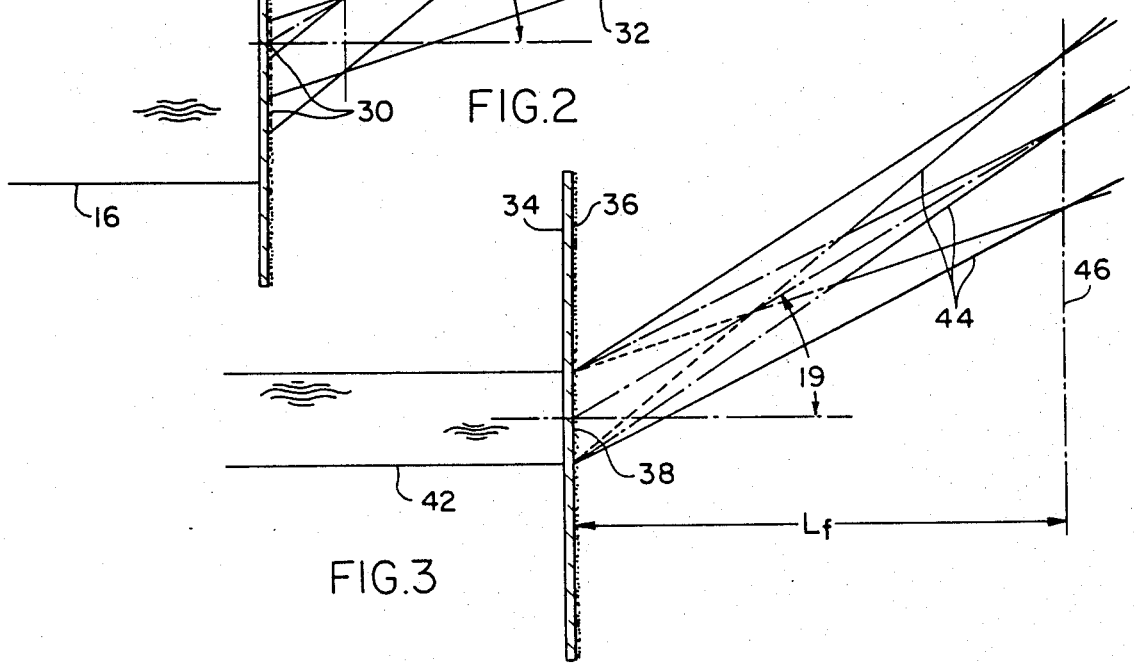
FIG. 3 shows the set up for playback of the multiple lens.

A parallel beam from a coherent light source is split into two beams. One of these beams is used as reference beam 16. The other beam is directed through the spatial filter 14 and the lens 10 and emerges as convergent beam 18. Angle 19 between beams 16 and 18 determines the off-axis angle of the fly's eye lens (FIG. 2) and subsequently the off-axis angle of the final multiple lens (FIG. 3). In the preferred embodiment, a laser is used as a coherent light source. Also reference beam 16 is a collimated beam, that is, a parallel beam with constant phase and amplitude throughout any transverse plane of propagation in the preferred embodiment. A first photographic plate 20 to which is applied a film emulsion 22 is placed behind a mask 24, which is opaque to radiation from the coherent source, with the emulsion 22 facing forward, that is, so that beams 16 and 18 strike emulsion 24 before plate 20. Mask 24 is located so that its plane is normal to reference beam 16 and an opening 26 in mask 24 permits angle 28 of the convergent beam to strike emulsion 22. By convention, the f-number of a lens is defined as the ratio of its focal length to its diameter. It may be readily shown that the f-number, f, of a lens is given by:

$$f = 1/[2 \tan(\theta/2)]$$

where the diameter of the lens is subtended by angle $\theta$ having a vertex at the focal point of the lens. Thus, angle 28 (FIGS. 1 and 2) determines the f-number of each lenslet in the fly's eye lens and, in turn, of each lens in the final multiple lens. Angle 28 may be changed to adjust to a desired f-number by changing distance 12 between spatial filter 14 and lens 10. Upon exposure, the area 30 of emulsion 22 on plate 20 behind opening 26 in mask 24 records the interference pattern of reference beam 16 and the convergent beam 18. In the preferred embodiment, plate 20 and emulsion 22 are a photographic spectroscopic plate with an emulsion such as a Kodak 649F or equivalent high resolution, however, in practice any suitable holographic recording medium such as photochromic crystals or a thermoplastic material may be used. Also, it is not essential to the invention that the plate 20 be normal to reference beam 16. A 90 degree angle is chosen in the preferred embodiment because it is easier to reproduce a right angle for reconstruction.

After exposure, the plate 20 is moved or indexed parallel to its plane so that a new area 30 registers with opening 26 in mask 24, and this new area 30 (that does not overlap previously exposed areas 30) is exposed. The indexing and exposure steps are repeated until all the desired areas are exposed. Indexing may be horizontal, vertical or on a bias as long as the exposure areas 30 do not overlap. The indexing of plate 20 between exposures determines the pattern and spacing of the areas 30 which become the lenslets on the fly's eye lens.

The pattern and spacing of lenslets on the fly's eye lens determines, in turn, the pattern and spacing of playback beams of the completed multiple holographic lens. The shape and size of opening 26 in mask 24 determines the shape and size of the lenslets in the fly's eye lens. Non-overlapping of the lenslets insures that undesired cross product terms will not be introduced into the final multiple lens.

When all the areas 30 have been exposed, plate 20 is developed by suitable means to form the completed fly's eye lens.

In the second step of the process of the present invention, the fly's eye lens 20 is used to fabricate the multiple holographic lens with a single exposure. Referring to FIG. 2, the completed fly's eye lens 20 is positioned so that its plane is normal to beam 16, but it is turned around from its position in FIG. 1. That is, beam 16 now passes through the plate 20 before striking the emulsion 22. Again, any beam may be substituted for beam 16, as long as it is identical to, exhibits the identical phase and amplitude characteristics across its plane of propagation to the reference beam used to record the fly's eye lens 20. Also an angle of the beam 16 with the plane of the plate 20 other than a right angle may be used as long as it is identical to the angle formed by the reference beam used to record the lens.

On striking the fly's eye lens, beam 16 results in a multiple diverging beam array 32, which illuminates a second photographic plate 34 with a second applied emulsion 36, resulting in a region 38 where all beams overlap. An array 32 of three beams is shown by way of example. As in the case of the first plate 20, in practice any suitable high resolution recording medium could be used in place of plate 34. The distance 37 between plates 20 and 34 is selected for the desired focal length, $L_f$ (FIGS. 2 and 3), of the multiple lens.

It should also be noted that plates 20 and 34 need not be parallel as shown in FIG. 2. In practice, the off-axis angle of the focal points of the multiple lens may be changed from angle 19 by positioning plates 20 and 34 at some angle with respect to each other.

A collimated reference beam 40 from the same source as beam 16 is directed toward area 38 on plate 34. In practice, it is not essential that beam 40 be collimated, as long as it may be reproduced precisely. The stationary interference pattern from beam 40 and beams 32 is recorded on plate 34 in a single exposure. Plate 34 is then developed by suitable means to form a multiple holographic lens.

FIG. 3 shows the set up for playback of the lens 34. As shown, plate 34 is rotated 180 degrees from its configuration in FIG. 2. Collimated beam 42 is directed at area 38 of plate 34, the multiple holographic lens, resulting in beams 44 focused in focal plane 46. While three beams 44 are shown by way of example, it is possible using the two step process of the present invention to fabricate multiple lenses which will split beams into hundreds of parallel beams focused in a two-dimensional pattern on a focal plane.

Other modifications and variations of the foregoing process are also possible without departing from the spirit of the present invention. For this reason, the preferred embodiment should be considered by way of example only, and not as limiting the scope of the invention.

What is claimed is:

1. A method of fabricating a multiple holographic lens comprising the steps of:
    fabricating an off-axis fly's eye lens with a plurality of non-overlapping lenslets, each such lenslet having a predetermined f-number and covering a non-negligible area on the lens;
    inserting the fly's eye lens in a first beam of light from a coherent source to provide a plurality of refracted beams in one to one correspondence with the lenslets of the fly's eye lens;
    positioning a holographic recording medium so that an area thereon is illuminated simultaneously by each of the refracted beams;
    directing a second beam of light from the coherent source toward the area of the holographic recording medium illuminated by the refracted beams;
    exposiing the holographic recording medium simultaneously to the second beam and the refracted beams;
    developing the holographic recording medium to form the multiple holographic lens therefrom.

2. The method of claim 1 wherein the fly's eye lens is a plastic fly's eye lens.

3. The method of claim 1 wherein a desired focal length of the multiple holographic lens is selected by setting a distance between the fly's eye lens and the holographic recording medium prior to exposure of the holographic recording medium.

4. A method of fabricating a multiple holographic lens comprising the steps of:

determining a desired number, pattern, spacing and off-axis angle of a plurality of focal points in a focal plane of the multiple holographic lens;

positioning a first holographic recording medium directly behind a mask opaque to radiation from a coherent light source, said mask having an opening of predetermined shape and size, said opening allowing radiation from the coherent light source to pass through;

directing a first beam from the coherent light source toward the opening in the mask;

directing a second beam from the coherent source through a spatial filter, then through a lens and then toward the opening in the mask such that an angle between the first and second beams determines the desired off-axis angle of the focal points of the multiple holographic lens;

indexing the first holographic recording medium so that an unexposed area thereon registers with the opening in the mask, said area being one of a plurality of non-overlapping areas equal in number to the desired number of focal points of the multiple holographic lens, said plurality of areas being located on a plane of the first holographic recording medium in an identical pattern to the desired pattern of focal points on the focal plane of the multiple holographic lens;

exposing the area on the first holographic recording medium behind the opening in the mask simultaneously to the first and second beams;

repeating the indexing and exposing steps until all the areas on the first holographic recording medium are exposed;

developing the first holographic recording medium;

inserting the first holographic recording medium in a third beam from the coherent light source, said third beam being identical to the first beam; so that the third beam provides a plurality of refracted beams in one to one correspondence with the exposed areas of the first holographic recording medium;

positioning a second holographic recording medium so that an area thereon is simultaneously illuminated by each of the refracted beams;

directing a fourth beam from the coherent light source toward the area on the second holographic recording medium illuminated by the refracted beams;

exposing the second holographic recording medium simultaneously to the fourth beam and the refracted beams;

developing the second holographic recording medium to form the multiple holographic lens therefrom.

5. The method of claim 4 wherein a desired focal length of the multiple holographic lens is selected by setting a distance between the first and second holographic recording mediums prior to exposure of the second holographic recording medium.

6. The method of claim 5 wherein a desired f-number of the multiple holographic lens is selected by setting a distance between the spatial filter and the lens prior to exposure of the first holographic recording medium.

7. The method of claim 4 wherein the coherent light source is a laser.

8. The method of claim 4 wherein the lens is a spherical lens.

9. The method of claim 4 wherein the lens is a specially corrected aspheric lens.

10. The method of claim 4 wherein the first holographic recording medium is a first photographic plate to which is applied a first film emulsion.

11. The method of claim 10 wherein the second holographic recording medium is a second photographic plate to which is applied a second film emulsion.

* * * * *